United States Patent [19]

Bopp

[11] 4,312,433
[45] Jan. 26, 1982

[54] VISCOUS FLUID CLUTCH AND STANDPIPE ARRANGEMENT THEREFOR

[75] Inventor: Warren G. Bopp, Farmington Hills, Mich.

[73] Assignee: Eaton Corporation, Cleveland, Ohio

[21] Appl. No.: 947,661

[22] Filed: Oct. 2, 1978

[51] Int. Cl.³ .................... F16D 35/00; F16D 43/25
[52] U.S. Cl. .............................. 192/58 B; 192/82 T
[58] Field of Search .......................... 192/58 B, 82 T

[56] References Cited

U.S. PATENT DOCUMENTS

| | | | |
|---|---|---|---|
| 3,559,786 | 2/1971 | Long, Jr. | 192/58 B |
| 3,648,811 | 3/1972 | La Flame | 192/82 T X |
| 3,809,197 | 5/1974 | Clancey | 192/58 B |
| 3,856,122 | 12/1974 | Leichliter | 192/58 B |
| 4,064,980 | 12/1977 | Tinholt | 192/82 T X |
| 4,086,990 | 5/1978 | Spence | 192/58 B |

Primary Examiner—Allan D. Herrmann
Attorney, Agent, or Firm—R. J. McCloskey; D. Wood; J. C. Lewis

[57] ABSTRACT

A viscous fan clutch is typically employed in a fan drive mechanism within a truck or automobile. A shaft, driven by the engine, rotates a clutch member within the fan drive. The clutch member is arranged for fluid engagement with a body member for the transmission of torque thereto when the fluid is disposed in an operating chamber defined by complimentary shear surfaces in the clutch and body members. During relative rotation between the two members, fluid is pumped through a radially disposed standpipe to a point within a fluid storage chamber near the axis of rotation to prevent bleed back of the fluid through the pump at times when the pump pressure is relatively low.

8 Claims, 1 Drawing Figure

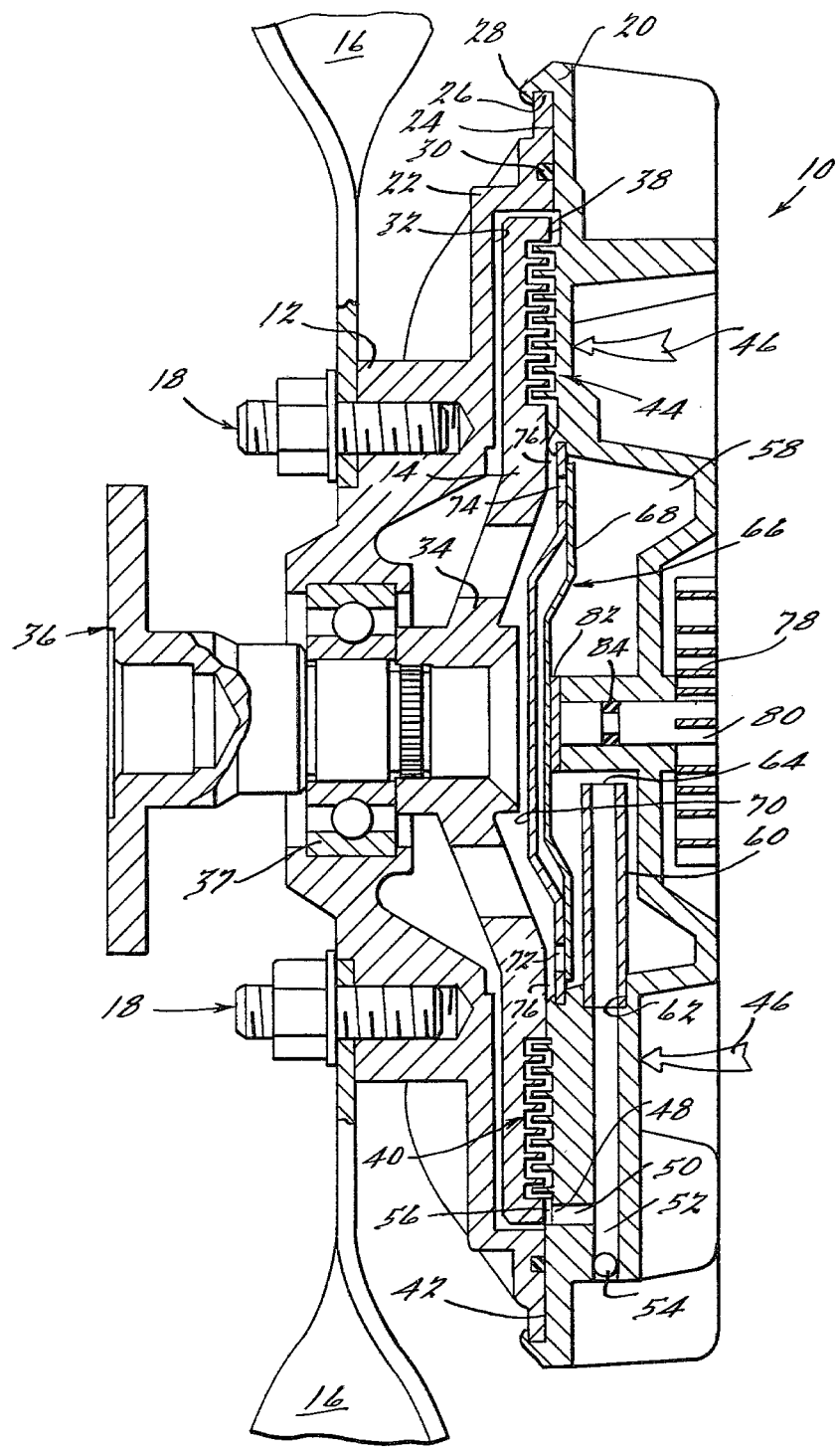

VISCOUS FLUID CLUTCH AND STANDPIPE ARRANGEMENT THEREFOR

INTRODUCTION

The present invention relates to viscous fluid couplings, and more particularly to such couplings which check fluid therein from bleeding backwards therethrough during periods of relatively low torque transmission.

CROSS-REFERENCE

The subject matter of this application is related to that of U.S. application Ser. No. 681,106, filed Apr. 28, 1976, now U.S. Pat. No. 4,056,178, issued Nov. 1, 1977 and U.S. application Ser. No. 731,263, filed Oct. 12, 1976, now U.S. Pat. No. 4,064,980, issued Dec. 27, 1977.

BACKGROUND OF THE INVENTION

It will be apparent from a reading of the specification that the present invention may be advantageously utilized with fluid couplings intended for many different applications. However, the invention is especially useful when applied to a viscous fluid coupling or clutch which serves as a drive for the radiator cooling fan of a vehicle engine, and will be described in connection therewith.

Viscous fluid couplings have received wide acceptance in the automobile industry for controlling the amount of torque transmitted to a radiator cooling fan. The most common form of such viscous fluid couplings is the air temperature response type such as illustrated in U.S. Pat. Nos. 3,055,473 to Oldberg et al. and 3,809,197 to Clancey.

A disadvantage common to such viscous fluid couplings is "morning sickness" i.e., the tendency of the viscous fluid to migrate backward through the centrifugal pump into the operating chamber when the engine is shut down, causing annoying high speed operation of the fan when the engine is next started in the cold condition as in the morning. The problem of high speed operation of a viscous fluid coupling upon cold start has been partially alleviated by the use of high capacity pumps which quickly pump any fluid which has drained back into the operating chamber when the engine was off into a fluid storage chamber. Although this has reduced the duration of "morning sickness", it has not eliminated it. Additionally, a secondary problem caused with the use of high capacity pumps is that for some modes of operation, fluid tends to be pumped into the storage chamber more quickly than it can be communicated back into the operating chamber. This causes an unpredictable response time and in some cases where the input speed is very high relative to fan speed, the fan drive will not engage at all.

BRIEF DESCRIPTION OF THE INVENTION

The present invention finds particular application in a viscous fan clutch of the type including a first clutch member fixed to a shaft for rotation therewith, a second clutch member mounted for rotation on the shaft and having shear surfaces which coact with complimentary shear surfaces on the first member to define an operating chamber therebetween and a fluid storage chamber disposed about the shaft axis. According to the invention, and by way of overcoming the above described shortcomings of viscous fluid clutches and, specifically, eliminating "morning sickness", the viscous fan clutch is provided with a pump which is operative to displace fluid from the operating chamber and discharge the fluid within the storage chamber at a point substantially adjacent the axis. This arrangement effectively eliminates bleed back into the operating chamber during shut down periods and thereby effectively eliminates "morning sickness" upon subsequent cold start.

The preferred embodiment of the invention incorporates at least one radially inwardly directed passageway which communicates fluid from the pumps to a point adjacent the axis.

In the preferred embodiment of the invention, the fluid storage chamber is a substantially annular cavity disposed coaxially with the axis and the passageway comprises a radially directed standpipe which interconnects the exit of the pump with a point within the fluid storage chamber adjacent the axis.

The pump means, in the preferred embodiment of the invention, is defined by the first and second members at a point radially distal the shaft and which operates during relative rotation between the members.

According to another aspect of the invention, the pump means comprises two diametrically opposed pumps, each communicating with an associated standpipe.

Various other features and advantages of this invention will become apparent upon reading the following specification, which, along with the patent drawings, describes and discloses a preferred illustrative embodiment of the invention in detail.

The invention makes reference to the accompanying drawing which has a broken side elevational view, taken mostly along the center line of a viscous fluid coupling assembly according to the invention.

DETAILED DESCRIPTION OF THE SPECIFIC EMBODIMENT

The present invention provides an improved viscous fluid clutch 10. The viscous fluid clutch 10 includes a body or output member 12 and a clutch or input member 14. The output member 12 has fan blades 16 secured thereto by means of fastener assemblies 18. Fan blades 16 are adapted to rotate and provide a flow of cooling air across an engine or through a radiator with which the fan is associated.

Output member 12 is made in two parts which, for the purposes of this application, are termed a forward coupling member 20 and a rear coupling member 22. Forward coupling member 20 is formed with a pilot portion having a surface 24 which extends peripherally therearound and which guides the outer portion 26 of rear coupling member 22 into assembled position therewith. When coupling members 20 and 22 are guided together into the position illustrated, a portion 28 of forward coupling 20 is bent over to secure and seal the forward and rear coupling members 20 and 22 respectively. A suitable gasket type O-ring seal 30 is provided between coupling members 20 and 22 in order to prevent leakage of viscous shear fluid therebetween.

Output member 12, constructed of the assembled forward and rear coupling members 20 and 22 defines a chamber generally designated 32 in which input member 14 rotates. Input member 14 is a disc shaped member which has an integral hub portion 34. Hub portion 34 is suitably, fixedly secured for rotation with a shaft 36 which comprises the input shaft for driving input member 14. Output member 12 is mounted for rotation about shaft 36 upon an intermediate bearing 37. Shaft 36 may be driven by any suitable manner as by a pulley (not shown) which is driven by a belt from a crank shaft of the engine with which viscous coupling 10 is associated.

Input member 14 and output member 12 have cooperating shear surfaces thereon which are spaced very closely to each other and a viscous shear medium in the space between the surfaces transmits torque from input member 14 to output member 12 so that output member 12 rotates due to the torque transmission through the viscous shear fluid.

In the embodiment illustrated, the torque transmitting surfaces on input and output members 14 and 12 are in the form of a plurality of lands and grooves. More specifically, a series of lands and grooves are formed on the forward face 38 of input member 14 and are generally designated 40. Cooperating lands and grooves are formed on the face 42 of forward coupling member 20 and are generally designated 44. Lands and grooves 44 on forward coupling member 20 cooperate with lands and grooves 40 on input coupling member 14 and are in effect interdigitated as shown in the figure when assembled. The lands and grooves are very closely spaced and provide a substantial area for the transmission of torque between input and output coupling members 14 and 12 in view of their relatively large number. In fact, there are nine projecting lands on output member 12 which project into nine grooves on input member 14 and eight lands on input member 14 projecting into eight grooves on output member 12.

Cooperating lands and grooves 40 and 44 are located in a direct line with the ram air which impinges against the front face of forward coupling member 20. As a result, lands and grooves 40 and 44, which effect the torque transmission, are located as closely as possible to the ram air as indicated by arrows 46. There is a substantial amount of heat disipation due to such location of lands and grooves 40 and 44. This is a substantial improvement over designs having lands and grooves on the rear face of an input coupling member and cooperating lands and grooves on a meeting rear part, out of the ram air stream. It should also be apparent that there is a substantial number of cooperating lands and grooves and these provide a substantial torque transmitting surface area so that the viscous coupling has substantial torque transmitting capability. This enables the viscous coupling to be readily used for the friving of fan blades for example, in a truck, automobile or other vehicle.

As is known, the amount of torque transmitted between lands and grooves 40 and 44 to drive fan 16 is a function of the amount of fluid in the viscous shear space or operating chamber therebetween. The viscous coupling of the present invention is provided with a construction where the amount of viscous shear fluid in that shear space can be varied, due to requirements for fan cooling. This is effected generally by the use of a mechanism for pumping viscous fluid from the shear space and a temperature sensing valve mechanism for controlling the flow of fluid back into the shear space.

The viscous shear fluid may be pumped from the shear space by the action of a pair of pumping surfaces which are formed on face 42 of forward coupling member 20. This pumping arrangement is well known in the art and is described in detail in U.S. Pat. No. 3,809,197, the specification of which is incorporated herein by reference. The pumping surfaces are located in the path of flow of fluid as it is dragged around forward coupling member 20 by rotation of input member 14. The impingement against these surfaces creates a pressure adjacent pump exit ports 48 in output member 12. Pump exit ports 48 communicate with respective axially extending passages one of which is shown in the figure and designated 50. Passage 50 communicates with a radially extending passageway 52 in forward coupling member 20. Passageway 52 is sealed at its radial outer end by a suitable means such as a plug or pressed in ball, designated 54. A similar radial flow passageway (not shown) cooperates with the other pump exit port (not illustrated).

Pump exit ports 48 are formed at one end of arcuate channels 56 in face 42 of forward coupling member 20. Each arcuate channel 56 extends slightly less than 180° around output member 12, the viscous fluid being moved therein due to the movement for rotation of input member 14 relative to output member 12. When the fluid impinges against surfaces described hereinabove, it then flows through passage 50 associated with pump exit ports 48 and into a central fluid storage chamber 58 after passing radially inwardly through passage 50 and a passage extending standpipe 60. The radially inwardmost end of passage 52 has an area of increased diameter 62 within which the radially outwardmost end of standpipe 60 is pressed fit for retention thereby. Standpipe 60 depends radially inwardly from area of increased diameter 62 and terminates in a discharge opening 64 at a point within fluid storage chamber 58 adjacent or relatively near the central axis of shaft 36. Fluid storage chamber 58 comprises an annular chamber which encircles the axis of rotation of input and output members 14 and 12 and provides for the storage of viscous shear fluid therein. The volume of fluid storage chamber 58 is such that substantially all of the viscous shear fluid in the coupling may be stored therein, the surface of the stored fluid being at all times radially outward from discharge opening 64. Thus, even in the condition when all of the viscous fluid within clutch 10 is stored within fluid storage chamber 58, the fluid cannot migrate or drain back through passages 50 and 52. This is true both in static and dynamic conditions for when output member 12 is not rotating, all viscous fluid stored in fluid storage chamber 58 will come to rest in the lowermost portion of fluid storage chamber 58, its surface being below discharge opening 64. When output member 12 is rotating, viscous fluid stored within fluid storage chamber 58 is forced towards the radially outwardmost wall of fluid storage chamber 58 and, again, the surface thereof is radially outward from discharge opening 64. Additionally, in the position illustrated, the standpipe which is not illustrated will be projecting radially downwardly into fluid storage chamber 58 and will also be unavailable as a drain passage for viscous fluid to return to passages 50 and 52. It is contemplated that the actual radial displacement of discharge opening 64 from the axis of rotation of shaft 36 can vary depending upon the viscous fluid storage capacity of that portion of fluid storage chamber 58 located radially outwardly of discharge opening 64. What is important is that, under all conditions, the level of the viscous fluid within fluid storage 58 be radially outward from discharge opening 64.

The viscous shear fluid, as noted hereinabove, flows into the shear space defined by lands and grooves 40 and 44 under the control of a temperature responsive valve mechanism generally designated 66. Valve mechanism 66 specifically controls the flow of viscous fluid from fluid storage chamber 58 into the shear space.

Valve mechanism 66 includes a valve member 68 which cooperates with a plate 70 which defines one side of fluid storage chamber 58. Plate 70 is suitably secured to forward coupling member 20 around periphery of plate 70 and thereby defines the rear side of fluid storage chamber 58. Plate 70 has a pair of holes 72 and 74 therein and valve member 68 extends radially relative to plate 70 and is positionable to selectively overlay holes 72 and 74. If valve member 68 closes holes 72 and 74, the fluid may not flow from storage chamber 58 outwardly through holes 72 and 74. When valve member 68 is moved so that holes 72 and 74 are opened, fluid flows from fluid storage chamber 58 through those holes and into an area designated 76 in the drawing and from that area the fluid is thrown by centrifugal force outwardly into the shear space between lands and grooves 40 and 44.

Valve member 68 is moved relative to plate 70 are relative to holes 72 and 74 therein by a temperature sensing bi-metallic spring element 78 which is suitably mounted in a conventional manner on forward coupling member 20 and which is connected with a shaft 80. Shaft 80 on its inner end is suitably connected to valve member 68 through an intermediate washer 82 such as by spot welding or the like and O-ring 84 which resides in an area of reduced diameter in shaft 80 substantially intermediate washer 82 and spring element 78 serves to form a seal between shaft 80 and forward coupling member 20. Temperature sensing bi-metallic spring element 78 is of a type which, when it senses a change in the ambiant temperature surrounding it, it effects the rotation of shaft member 80. Shaft member 80, in turn, effects a movement of valve member 68 relative to plate 80. The specific temperature responsive valve device is similar to the valve device disclosed in U.S. Pat. No. 3,263,783 and reference may be made thereto for further details of construction and operation.

If it is desired to reduce the amount of fluid in the shear surface between lands and grooves 40 and 44, it is necessary only to effect a movement of valve member 68 into a position blocking the flow of fluid from fluid storage chamber 58 into area 76. This occurs when temperature sensing bi-metal element 78 senses a low temperature and therefor a reduction in the cooling required by fan 16. Holes 72 and 74 will be closed or their open area reduced, minimizing flow into the shear space. As a result, the rotation of input member 14 will cause fluid to be dragged or moved relative to the surfaces within channels 56 and the fluid will then flow through pump exit ports 48 and into fluid storage chamber 58 through discharge opening 64 of standpipe 60. As a result, there will be a net reduction in fluid in the shear space and therefore reduction in the torque transmitted to fan blades 16. In the event that it is desired to increase the torque transmitted to fan blade 16, it is necessary then to increase the amount of fluid in the shear space, defined by lands and grooves 40 and 44 respectively. As a result, holes 72 and 74 must pass a greater amount of fluid into the shear space than that which is being passed from the shear space due to the action of the pumping surfaces. Therefor, holes 72 and 74 must be opened by valve member 68 in order to enable a sufficient flow of fluid into the shear space to occur so that there is a net gain in the fluid added to the shear space.

When viscous fluid clutch 10 is at rest, all of the viscous shear fluid takes a position in the lower part thereof. Upon rotation, the viscous shear fluid is dragged around a periphery of clutch 10 by the rotation and due to centrifugal force, the viscous shear fluid flows outwardly into the shear space. Once located in the shear space, the viscous shear fluid due to the pumping action of the pumping surfaces, flows into fluid storage chamber 58 and the flow of fluid from the fluid storage chamber 58 is under the control of valve member 68. As input member 14 rotates relative to output member 12, viscous shear fluid in the shear space between interdigitated lands and grooves 40 and 44 transmits torque from input member 14 to output member 12 to effect a rotation of fan blades 16. As this rotation occurs, periodic alignment occurs between radially disposed channels in input and output members 14 and 12 as is described in detail in U.S. Pat. No. 3,809,197. As this occurs, the periodic alignment between those channels defines a relatively large passageway for the radially outward flow of fluid from fluid storage chamber 58, thereby filling the shear space at the outer periphery of input and output members 14 and 12. These channels provide for flow radially outwardly at all times not only when aligned, and provide for rapid response due to flow from fluid storage chamber 58 and also during initial startup.

It is to be understood that the invention has been described with reference to a specific embodiment which provides the features and advantages previously described, and that such specific embodiment is susceptible of modification, as will be apparent to those skilled in the art. Accordingly, the foregoing is not to be construed in a limiting sense.

I claim:

1. A viscous fluid clutch comprising:
 a first member secured for rotation with a shaft;
 a second member rotatably disposed on said shaft relative to said first member;
 shear surfaces disposed on said first and second members and forming an operating chamber therebetween;
 a fluid storage chamber adjacent said operating chamber and disposed about the axis of said shaft;
 pump means operative to displace fluid from said operating chamber and discharge said fluid within said fluid storage chamber; and
 means operative to check the reverse flow of fluid from said fluid storage chamber to said operating chamber through said pump means during periods of relatively low torque transmission through said clutch when substantially all of said fluid is disposed within said storage chamber.

2. A viscous fluid clutch comprising:
 a first member secured for rotation with a shaft;
 a second member rotatably disposed on said shaft relative to said first member;
 shear surfaces disposed on said first and second members and forming an operating chamber therebetween;
 a fluid storage chamber adjacent said operating chamber and disposed about the axis of said shaft;
 pump means operative to displace fluid from said operating chamber to said fluid storage chamber through at least one radially inwardly directed passageway operative to discharge said fluid within said fluid storage chamber at a point substantially adjacent said axis and to check the reverse flow of fluid therethrough during periods of relatively low torque transmission through said clutch when substantially all of said fluid is disposed within said storage chamber wherein during gravitational forces substantially exceed any centrifugal forces acting upon said fluid within said storage chamber.

3. The viscous fluid clutch of claim 2, wherein said fluid storage chamber comprises a substantially annular cavity disposed coaxially with said axis and said passageway comprises a substantially radially directed standpipe disposed within said cavity.

4. The viscous fluid clutch of claim 2, wherein said pump means is defined by said members radially distal said shaft and operates during relative rotation between said members.

5. An improved viscous fluid clutch of the type comprising a first member secured for rotation with a shaft, a second member rotatably disposed on said shaft relative to said first member, said members being complimentary shear surfaces for the transmission of torque therebetween, an operating chamber, a fluid storage chamber disposed about the axis of said shaft and pump means for displacing fluid from said operating chamber, said improvement comprising:

at least one radially inwardly directed passageway interconnecting the outlet of said pump means and said fluid storage chamber at a point therein substantially adjacent said axis, said passageway operative to check the reverse flow of fluid therethrough during periods of relatively low torque transmission through said clutch when substantially all of said fluid is disposed within said storage chamber.

6. The viscous fluid clutch of claim 5, wherein said fluid storage chamber comprises a substantially annular cavity disposed coaxially with said axis and said passageway comprises a substantially radially directed standpipe disposed within said cavity.

7. A viscous fluid clutch comprising:
  a clutch member secured for rotation with a shaft;
  a cover member rotatably disposed on said shaft relative to said first member;
  shear surfaces disposed on said clutch and cover members and forming an operating chamber therebetween;
  a reservoir cover affixed to said cover member adjacent said clutch member and defining an annular fluid storage chamber in combination with said cover member, said fluid storage chamber being disposed coaxially with said shaft;
  at least one pump defined by adjacent portions of said clutch member and cover member radially distal said shaft and operative to displace fluid from said operating chamber radially inwardly to a point within said fluid storage chamber substantially adjacent the axis of said shaft and which is spaced above the uppermost surface level assumed by the fluid within said storage chamber when substantially all of said fluid is disposed therein during periods of relatively low torque transmission through said clutch; and
  valve means operative to selectively interconnect said fluid storage chamber and operating chamber whereby in a first position said valve means prevents fluid in said fluid storage chamber from flowing into said operating chamber and in a second position said valve means establishes fluid communication between the radially outwardmost portion of said fluid storage chamber and said operating chamber, the fluid flowing therebetween under the influence of centrifugal forces acting upon fluid within said fluid storage chamber during periods of relatively high torque transmission through said clutch.

8. The viscous fluid clutch of claim 7, wherein a substantially radially oriented standpipe interconnects the outlet of each pump and discharges fluid into the said fluid storage chamber at said point substantially adjacent said axis.

* * * * *